United States Patent Office 3,755,472
Patented Aug. 28, 1973

3,755,472
8-HALO-2-MENTHENE AND ITS METHOD
OF PREPARATION
Albert B. Booth, Jekyll Island, Ga., assignor to
Hercules Incorporated, Wilmington, Del.
No Drawing. Application July 9, 1968, Ser. No. 743,293,
which is a division of application Ser. No. 563,370,
July 7, 1966. Divided and this application July 27, 1970,
Ser. No. 58,683
Int. Cl. C07c 17/08, 23/10
U.S. Cl. 260—648 R         2 Claims

ABSTRACT OF THE DISCLOSURE

An 8-halo-2-menthene, such as 8-chloro-2-menthene, is prepared by reacting d-trans-isolimonene and a hydrogen halide, such as hydrogen chloride. d-2,4(8)-p-menthadiene and 2-trans-menthene can be prepared from the 8-halo-2-menthenes.

This application is a continuation-in-part of application Ser. No. 743,293, filed July 9, 1968, now abandoned, which in turn is a division of application Ser. No. 563,370, filed July 7, 1966, now Patent 3,407,241. This invention relates to the conversion of 3-carene to industrial chemicals, and particularly to the conversion of 3-carene to 4-carene and the further conversion of 4-carene to useful para-monocyclic terpene derivatives. More particularly, this invention relates to the conversion of dextro-3-carene to levomenthol. Also, this invention relates to 8-halo-2-menthenes derived from d-trans-isolimonene, the d-trans-isolimonene being derived by thermal treatment of d-4-carene.

The carenes occur naturally in various essential oils and one of them, dextro-3-carene (d-3-carene), is a major constituent of turpentines. Commercially important pine species which yield turpentine rich in d-3-carene are found in all continents of the world where pine trees occur naturally, some typical species being P. Ponderosa in North America, P. Sylvestris in Europe, and P. Longifolia in Asia.

For purposes of this application, the shorter and more modern term, 3-carene, is used in place of the older term, delta-3-carene, and 4-carene is used in place of delta-4-carene.

The carenes can be represented by the structural formula

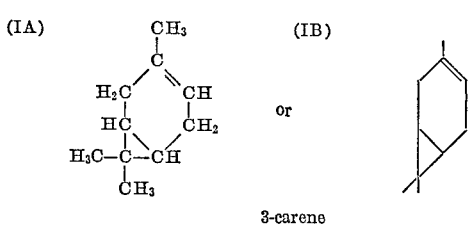

3-carene

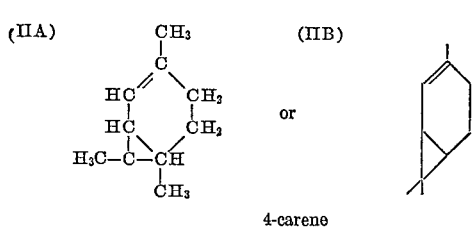

4-carene

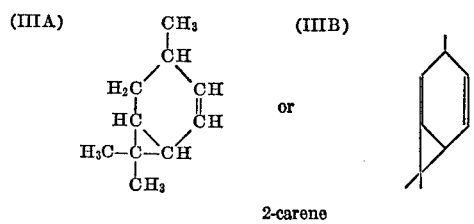

2-carene

I have found that by means of new conversions 3-carene can be utilized as a chemical raw material leading to valuable products.

I have found that in the presence of strong bases 3-carene is converted partially to its isomer, 4-carene. This partial conversion of 3-carene to 4-carene has the nature of a reversible reaction and can be carried out so as to come to an equilibrium mixture of 3-carene and 4-carene with not more than traces of other components.

The partial conversion of 3-carene to 4-carene would not be unusually useful in itself because like 3-carene, 4-carene has no known use except as a component of turpentine, the turpentine being useful as a paint thinner, and the like. However, I made the additional discovery that heating 4-carene isomerizes it substantially quantitatively to isolimonene, which is also known as 2,8-menthadiene.

Isolimonene can be represented by the formula

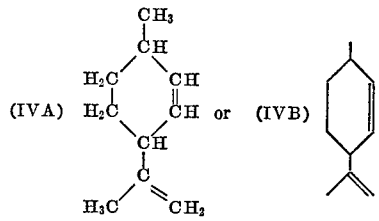

Isolimonene is suitable for further conversion to other useful materials as hereinafter disclosed.

The isolimonene produced by thermal treatment of d-4-carene (derived from d-3-carene) is the d-trans-isomer. This isomer is sterically related to the valuable levomenthol.

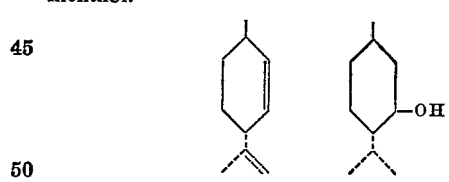

It is known (Pigulevsky and Kozhin, J. Gen. Chem. U.S.S.R. Eng. TR 27, 879–90, reference to which is hereby made) that d-trans-2-menthene can be converted to levo-menthol (plus carvomenthol) by a process of epoxidation and hydrogenation of the epoxide. I have found that d-trans-isolimonene can be hydrogenated with a high degree of selectivity under certain conditions to d-trans-2-menthene. The compound, d-trans-2-menthene can be represented by the formula

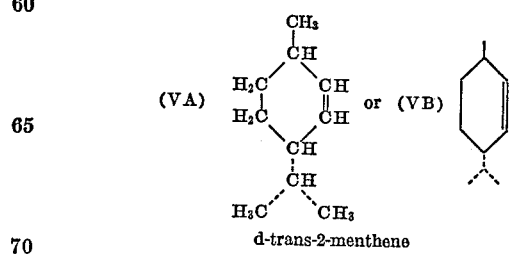

d-trans-2-menthene

The present process of converting d-3-carene to d-trans-isolimonene and the selective hydrogenation of d-transisolimonene to d-trans-2-menthene provides a means of converting the hitherto nearly valueless d-3-carene to an economically important chemical, levo-menthol, most of which is still obtained from foreign agricultural sources. Noncatalytic methods can also be used for accomplishing the reduction of d-trans-isolimonene to d-trans-2-menthene as will be described more fully hereinafter and also as will be exemplified with working examples of this reduction.

I have found still another way to convert d-trans-isolimonene to levo-menthol which comprises isomerizing it to d-2,4(8)-p-menthadiene by means of a strong base and then converting this hydrocarbon, by known means, to levo-menthol.

The compound, d-2,4(8)-p-menthadiene, also referred to in the art as d-isoterpinolene, can be represented by the formula

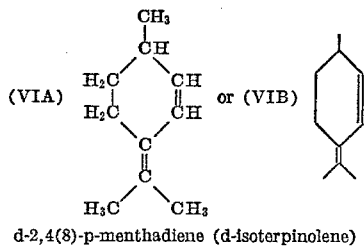

d-2,4(8)-p-menthadiene (d-isoterpinolene)

Thus, the present invention makes d-2,4(8)-p-menthadiene available for the first time starting from a cheap terpene, d-3-carene, which, from the present state of the art, has only solvent uses, and allows application of known processes, based on treatment of dl-2,4(8)-p-menthadiene, as described in Patents 2,851,481 and 2,866,826, to be applied to the manufacture of levo-menthol. Noncatalytic methods can be used also to accomplish the conversion of d-trans-isolimonene to d-2,4(8)-p-methadiene, as will be shown.

The first step in the manufacture of the above group of related useful chemicals from d-3-carene is to convert d-3-carene to d-4-carene by means of a catalyst. I have found that suitable catalysts comprise a class consisting of strong bases, applied under conditions where carbanions of a hydrocarbon can be formed.

The class of catalysts comprises materials which are essentially simple or complex alkali metal alkyls, including acyclic, cyclic and aromatic alkali metal derivatives, also strong bases such as alkali metal alcoholates and alkali metal amides, which are suitably used in media which allows their basicity to be developed. These alkali metal alcoholates are sufficiently basic to induce the formation of carbanions from hydrocarbons in the presence of dipolar aprotic solvents, such as dimethyl sulfoxide, but not in polar hydroxylic solvents, such as the alcohols. The alkali metal amides similarly are sufficiently basic to cause formation of carbanions when the medium is an amine, or a hydrocarbon, but not when the medium is an alcohol.

It is, of course, convenient to use a hydrocarbon as a medium and very convenient to use d-3-carene itself. In some systems both the d-3-carene and the strong base are present under conditions of appreciable mutual solubility and so the reaction is at least in part a homogeneous one. Under other conditions the strong base is substantially insoluble in the d-3-carene-containing phase and the reaction is essentially a heterogeneous one taking place on the surface of the base catalyst.

Organic compounds that form compounds or complexes with alkali metals, such as Li, Na, K, Rb, Cs, to provide strong base catalysts for use in this invention include such hydrocarbons as olefins, cyclic olefins, aromatic hydrocarbons including polynuclear aromatic and aralkyl hydrocarbons, and acetylenic hydrocarbons; also heterocyclic compounds related to hydrocarbons wherein one or more carbons are replaced with nitrogen or other hetero atoms, such as pyridine, alkyl pyridines, quinolines, pyrrole, and dibenzofuran.

In some cases sodium, or other alkali metal, reacts readily with the above types of organic compounds. In other cases the reaction is so sluggish that it is desirable to use a "promoter" or "initiator" to speed up the reaction between sodium and the organic compound. Such "promoters" or "initiators" may suitably be halogenated organic compounds which react readily with sodium, such, for example, as o-chlorotoluene, and also other metal alkyls including previously formed alkali metal derivatives of a hydrocarbon or related material. In industrial practice it may be desirable to use a little of an old but still active catalyst to help initiate or promote the reaction between sodium and a hydrocarbon, for example, to generate new catalyst. Catalysts such as the alkali metal derivatives of alcohols and amines can ordinarily be prepared by direct reaction of the alkali metal with the alcohol or amine, which usually proceeds readily enough without addition of an initiator.

Depending on the system selected, the strong base catalyst can be preformed and then mixed with the carene to be isomerized, or it can be formed in situ. Metallic sodium promoted with o-chlorotoluene or other halogen compounds as described by Pines and coworkers [see J.A.C.S. 77, 6314 (1955); J.A.C.S. 78, 1178 (1956) and Patent 2,804,489] is a suitable and cheap strong base. Other representative suitable bases are the sodium derivatives of methyl naphthalene in methyl naphthalene; the sodium and/or potassium derivative of gamma-picoline in gamma-picoline; potassium t-butoxide in dimethyl sulfoxide; lithium in ethylene diamine; amyl sodium in hydrocarbons; and the like. In general any base of sufficient strength to form a carbanion under the conditions used is within the scope of the present invention, and the examples, while given to show representative ways of practicing the invention, are not to be construed as limiting, inasmuch as other and equivalent combinations of strong bases, temperature, time and media can also be used.

In general the usual relationships of time, temperature and amount or activity of catalyst apply in the present case. Preferred temperatures ranges from room temperature to 180° C. The lower temperature is determined by the fact that much below room temperature the reaction tends to be slow unless a high ratio of catalyst to carene is utilized. Above 180° C., the thermal isomerization of 4-carene to isolimonene becomes an increasingly serious side reaction. In the presence of the base the isolimonene is converted to 2,4(8)-p-menthadiene. The formation of small amounts of both meta- and para-cymenes is another side reaction which increases as the temperature is raised. Thus, the preferred range of room temperature to 180° C. is not limiting, and the process can be operated above and below this range with the effects described above. If a catalyst system is selected where the isomerization proceeds rapidly at 180° C. or above, it is quite possible to reduce the time at such temperatures so that the course of the side reactions is largely suppressed and the result of the treatment is largely limited to the isomerization of d-3-carene to d-4-carene.

The isomerization of d-3-carene to d-4-carene is a reversible reaction and ultimately reaches an equilibrium value. The maximum d-4-carene in this equilibrium is about 45% by weight. It is, of course, not necessary to carry the isomerization to the equilibrium point. d-4-carene is lower boiling than d-3-carene and it is possible to stop the isomerization at any point and remove a d-4-carene concentrate by fractional distillation. Because d-4-carene is lower boiling, one mode of operation comprises charging d-3-carene and the catalyst (together with a suitable medium if appropriate for the catalyst) to a catalyst chamber which may be the reboiler of a still, or a chamber which feeds into a still, and removing an overhead product from the still which contains d-4-carene.

For the purpose of converting d-4-carene to d-trans-isolimonene, it is not necessary to separate the carenes from each other. I have found that if a mixture of d-3-carene and d-4-carene is heated to a temperature sufficient to cause isomerization of d-4-carene to d-trans-isolimonene the d-3-carene is substantially unchanged and can be separated readily from the d-trans-isolimonene by fractional distillation. The high degree of thermal stability of d-3-carene is recognized in the literature (Beilstein EIII, vol. 5, p. 363) which shows d-3-carene to be stable at least to 400° C. Suitable heating times are 16 hours at 200° C.; 3.25 hours at 220° C.; 43 minutes at 240° C.; and 11 minutes at 260° C. for substantially complete conversion of d-4-carene to d-transisolimonene. Still higher temperatures can be used at correspondingly shorter times, inasmuch as both d-trans-isolimonene and d-3-carene exhibit good thermal stability.

The thermally treated mixture is suitably rectified in a batch fractionating column or a series of fractionating columns comprising a continuous train, separating d-trans-isolimonene as a technically pure light fraction.

Concentrated d-3-carene is the next most volatile material and is likewise recovered as a technically pure material suitable for recycle to the step in which it is isomerized to d-4-carene.

If the base isomerization of d-3-carene to d-4-carene is run under conditions where side reaction products are important, these show up as a still higher boiling material which comprises chiefly meta- and para-cymenes and d-2,4(8)-p-menthadiene. These materials are suitably removed from the system as a higher boiling distillation cut or bottoms product and not recycled, in order to avoid their buildup.

Because of the fairly close boiling points of d-trans-isolimonene and d-3-carene, an efficient column should be used for this separation if d-trans-isolimonene of high purity is desired. In laboratory work it was found that a 1" diameter batch column packed with 10 feet of 0.16" protruded packing made a very satisfactory separation.

d-trans-isolimonene can be reduced to d-trans-2-menthene by strictly chemical methods. Addition of a hydrogen halide, such as hydrogen chloride or hydrogen bromide, proceeds selectively to the exocyclic double bond first, giving 8-halo-2-menthene in nearly quantitative yield. The halogen can be selectively removed by, for example, reduction with sodium and alcohol or other metal/active hydrogen combinations whereby there is produced d-trans-2-menthene.

d-trans-isolimonene can also be converted to d-2,4(8)-p-menthadiene. The d-2,4(8)-p-menthadiene can subsequently, if desired, be converted to levo-menthol according to the teachings of Pat. 2,851,481 and Pat. 2,866,826.

d-trans-isolimonene can be converted to d-2,4(8)-p-menthadiene by noncatalytic methods. Thus, for example, one mol of HCl is added to d-trans-isolimonene to give the monohydrochloride, 8-chloro-2-menthene, in substantially quantitative yield. Refluxing this with bases such as pyridine or alcoholic caustic potash converts it largely to d-2,4(8)-p-menthadiene.

The following examples are illustrative of this invention. In the examples, unless otherwise specified, parts and percentages are by weight.

EXAMPLE 1

An isomerization of d-3-carene was carried out in which active sodium catalyst was prepared in situ by refluxing and stirring a mixture of 3 liters of a 50:50 d-3-carene (95%)/xylene mixture previously distilled over sodium, 10 grams sodium metal and 10 cc. o-chlorotoluene. Refluxing and stirring was continued until infrared examination of a sample showed that equilibrium was approached. The mixture was then cooled and the catalyst settled. The carene/xylene mixture was decanted and replaced with ½ gallon of fresh carene only (no xylene) which had been distilled over sodium. The mixture was refluxed and stirred until infrared showed that the equilibration was approached. The carene was again decanted and replaced with fresh carene (distilled over sodium). This procedure was repeated until a total of six runs using full strength carene had been made over the same catalyst bed. Due to the multiplicity of runs, the procedure was simplified to merely allowing the mixture to stir and reflux overnight and then examining it the following morning to be sure that isomerization had taken place. Under these conditions the mixture refluxes at 170° C. to 175° C. More byproducts were formed. A gas chromatographic analysis of the sixth run using straight d-3-carene on the same catalyst bed showed:

| Component | Percent | Identity |
| --- | --- | --- |
| 1 | Trace | Not identified. |
| 2 | 0.3 | Do. |
| 3 | 1.1 | 2-carene. |
| 4 | 0.2 | Not identified. |
| 5 | 35.1 | d-4-carene. |
| 6 | 47.0 | d-3-carene. |
| 7 | 1.6 | Dipentene. |
| 8 | 0.3 | Not identified. |
| 9 | 7.3 | Meta- and para-cymenes. |
| 10 | 6.6 | d-2,4(8)-p-menthadiene. |
| 11 | 0.5 | Not identified. |

It will be seen that the ratio of d-4-carene to d-3-carene is about 43:57.

EXAMPLE 2

Most of the crude equilibrated carene prepared in Example 1 was filtered through a folded filter paper after decantation from the catalyst and charged to a 2-liter Parr stainless steel autoclave in 1500 cc. portions. Each charge was heated to 220° C. and held at 220° for 4 hours, then cooled. A pressure of about 40 p.s.i.g. developed at 220° Infrared examination showed no surviving d-4-carene; the d-4-carene bands disappeared and d-trans-isolimonene bands appeared. Negligible change occurred in the d-3-carene content. The d-trans-isolimonene in substantially pure form was separated by fractional distillation and had the following physical properties:

$n_D^{25}$: 1.4636
$d_{25}$: .8230
$d_D^{25}$ (10 cm. tube, neat): +167°
Purity by GC: 99%

EXAMPLE 3

8-chloro-2-menthene is prepared by charging one mol of d-trans-isolimonene to a vessel and then bubbling in hydrogen chloride gas at ambient temperature (about 25° C.) and at atmospheric pressure until one mol of hydrogen chloride is added to the d-trans-isolimonene. The addition of HCl to d-trans-isolimonene is followed by infrared spectrometry. The starting d-trans-isolimonene spectrum shows a strong absorption at 11.2 microns which corresponds to the exocyclic unsaturation, and another strong absorption at 13.7 microns which corresponds to the cis disubstituted ethylenic bond in the ring. As the addition of HCl proceeds, the absorption corresponding to the exocyclic unsaturation at 11.2 microns is seen to weaken and eventually disappear, but the absorption corresponding to the ring double bond retains its strength. The retention of this absorption shows that this function remains in the molecule. The 8-chloro-2-menthene resulting from the addition has besides its ring double bond absorption at 13.7 microns, also a Cl absorption at 14.7 microns, which absorption is not originally present in the d-trans-isolimonene.

EXAMPLE 4

8-bromo-2-menthene is prepared in accordance with Example 3 by substituting hydrogen bromide gas for hydrogen chloride gas. This addition can also be followed by infrared spectrometry.

EXAMPLE 5

To a 500 cc. stirred flask were charged 10 grams sodium metal and 100 grams toluene. The mixture was heated to reflux with stirring and there was fed in through a dropping funnel a mixture of 43 grams d-trans-isolimonene hydrochloride (8-chloro2-methene) prepared by the addition of one mol of HCl to 1 mol d-trans-isolimonene, and 25 grams tertiary butanol. Feeding was carried out over 30 minutes. The mixture became quite thick 5 minutes later and it was necessary to add 100 cc. additional toluene through the reflux condenser. Refluxing and stirring were continued for 5½ hours longer, at which time water was cautiously added dropwise to the refluxing mixture to destroy the remaining sodium and decompose the alcoholate. After washing (the toluene was mostly distilled off with a column and the crude product analyzed by infrared and gas chromatography. GC analysis (toluene free basis) showed 86% d-trans-2-menthene, the balance being mixed menthadienes from base elimination of HCl from the d-trans-isolimonene hydrochloride. As these impurities are higher boiling than d-trans-2-menthene, they are readily separable by fractional distillation.

EXAMPLE 6

In a 500 cc. stirred flask, 80 grams of pyridine were heated to reflux. Then 43 grams of d-trans-isolimonene hydrochloride (8-chloro-2-menthene) prepared by addition of 1 mole of HCl to 1 mol d-trans-isolimonene was fed in slowly. Refluxing and stirring were continued for 4 hours, with samples withdrawn at 1, 2 and 4 hours. Pot temperature during treatment was 122° C. Infrared examination of the samples, after washing out the pyridine and pyridine hydrochloride with dilute hydrochloric acid, showed that the product was chiefly d-2,4(8)-p-menthadiene, with a small amount of regenerated d-trans-isolimonene. Optical rotation in a 10 cm. tube was +77°. The reaction was complete at the first hour.

A similar treatment using methanolic KOH solution prepared from 200 grams methanol and 20 grams KOH pellets also produced d-2,4(8)-p-menthadiene as the chief product. Because of the low refluxing temperature (67° C.), the reaction required two hours to come close to completion. The presence of very weak methoxyl bands in the infrared spectrum showed that ether formation was a minor side reaction.

Preferred use of d-trans-isolimonene in accordance with this invention is in the production of levo-menthol. In this regard, and as above set forth, the d-trans-isolimonene is first converted to either d-trans-2-menthene or d-2,4,(8)-p-menthadiene. Either compound can then be converted to levo-menthol by methods known in the art.

It is to be understood that the above description of this invention is illustrative only and not in limitation thereof.

What I claim and desire to protect by Letters Patent is:
1. 8-chloro-2-menthene.
2. 8-bromo-2-menthene.

References Cited
FOREIGN PATENTS 159,514    1/1964    Russia _____ 260—048 R

OTHER REFERENCES

The Merck Index, 7th edition, p. 609 (1960).
Bardyshev et al.: Chem. Abstracts 61 16099e (1964).

DANIEL D. HORWITZ, Primary Examiner

U.S. Cl. X.R.
260—675.5, 631.5

PO-1050
(5/69)

UNITED STATES PATENT OFFICE
CERTIFICATE OF CORRECTION

Patent No. 3,755,472      Dated August 28, 1973

Inventor(s) Albert B. Booth (Case 4-7-9)

It is certified that error appears in the above-identified patent and that said Letters Patent are hereby corrected as shown below:

Column 1, formula (IIA), the " $\underset{CH_3}{|}$ " from the bottom of the benzene ring, should be under the single " C " instead of the " CH ".

Column 6, line 45, " $d_D^{25}$ " should read -- $\alpha_D^{25}$ --.

Signed and sealed this 20th day of November 1973.

(SEAL)
Attest:

EDWARD M. FLETCHER, JR.          RENE D. TEGTMEYER
Attesting Officer                    Acting Commissioner of Patents